Sept. 17, 1968  V. E. HENLEY  3,402,090
TIRE SHAPING APPARATUS
Filed May 14, 1965  2 Sheets-Sheet 1

INVENTOR
Virgil E. Henley
BY
ATTORNEYS

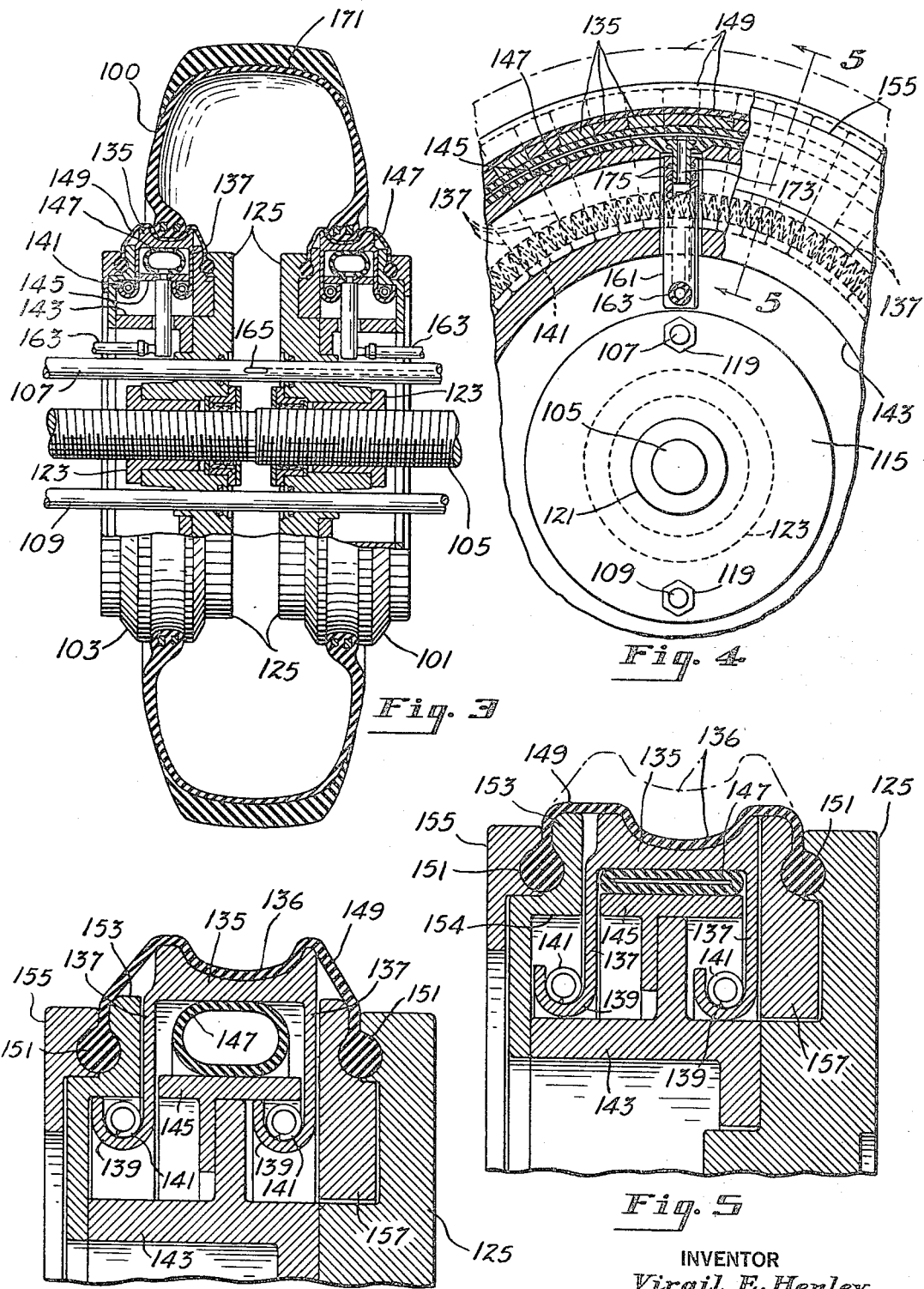

United States Patent Office 3,402,090
Patented Sept. 17, 1968

3,402,090
TIRE SHAPING APPARATUS
Virgil E. Henley, Akron, Ohio, assignor to The General Tire & Rubber Company, a corporation of Ohio
Filed May 14, 1965, Ser. No. 455,856
5 Claims. (Cl. 156—398)

ABSTRACT OF THE DISCLOSURE

A tire carcass shaping apparatus is composed of a pair of circular bead grippers mounted on a screw shaft for movement alternately toward and away from one another. Bladders underlying the bead grippers are inflated to urge sair grippers radially outwardly into air-tight engagement with the respective tire beads. Air under pressure is applied directly to the underside of the carcass with concomitant movement of the beads toward one another to transform the carcass from the flat band to toroidal shape. The shaper is preferably used with a tread and breaker drum and a transfer ring for the construction of radial ply tires.

---

The general procedure for constructing bias-ply tire, i.e., one in which the cords in the carcass extend obliquely from one bead to the other, involves wrapping a plurality of plies around a cylindrical surface to form an essentially annular band. The central portion of the band is then uniformly expanded a slight amount to provide a step or shoulder at either end, after which one or more inextensible bead rings are placed against each shoulder. The edges of the plies are then folded around said bead rings to form the bead portions of the tire. Chafer strips, breakers, and the elastomeric sidewalls and tread portions are then applied to the carcass after which the assembly is placed in a suitable mold where it is shaped and cured.

With the advent of the radial ply tire, i.e., a tire wherein the individual cords in the carcass extend in a radial or in a substantially radial direction from one bead to the other, it was found that in order to make the tire stable in a lateral direction, theb reakers, over the crown portion of the carcass, had to be made inextensible. This created a problem during the construction of the tire, inasmuch as the inextensible nature of the breaker made it difficult to apply the breaker on the flat band and thereafter increase the diameter of the crown portion of the tire during the conversion of the tire from the flat band to toric shape.

This problem has been partially circumvented through the development of a carcass building and expanding drum of the type described in my copending application, S.N. 423,442, filed on Jan. 5, 1965. On this drum, the carcass is built in a substantially flat band, and is then formed into toric shape, by use of an inflatable bladder comprising the surface of the drum. Thereafter, the inextensible breaker and tread are applied to the carcass and stitched down after which the tire is removed from the drum and is cured.

This apparatus has been found to be suitable for lightweight tires of single-bead construction. However, in constructing heavy duty truck and industrial tires wherein multiple beads are used, various problems have been encountered which have made it impractical to produce the tires on this type of machine. Instead, it has been a common practice to build the tire carcass on a conventional flat drum, such as the well-known collapsible type drum, and thereafter transfer the carcass to a separate drum, the surface of which consists of an inflatable bladder. After the introduction of air into the bladder, causing the carcass to assume the shape of a torus, the aforementioned inextensible breaker and tread are applied after which the drum is collapsed and the tire removed.

It is one object of this invention to provide an apparatus for shaping an uncured tire carcass, built according to the flat-band process, without the necessity of using a shaping bladder.

Another object is the provision of a carcass expander comprising a pair of bead supports spaced, but movable toward or away, from one another, said supports containing means to vary the diameter of the peripheral portion thereof whereby to sealingly engage the beads of the tire, and air-inlet means for introducing air, under pressure, into the space between the supports to transform the carcass to toric shape.

These, as well as other objects which will become readily apparent upon a full revelation of the details of this invention, are accomplished in the manner to be hereinafter described with frequent reference being made to the drawings in which:

FIGURE 3 is a view of the shaper shown in FIGURE 2, after the beads have been moved toward each other, the carcass formed into toric shape, and the annular tread and breaker assembled thereon;

FIGURE 4 is a fragmentary end view of the shaper taken along line 4—4 of FIGURE 1, partially broken away to show the bead-supporting segments;

FIGURE 5 is an enlarged cross-sectional view taken along line 5—5 of FIGURE 4; and FIGURE 6 is similar to FIGURE 5, but with the bead-supporting segments moved to the radially outermost position.

Figure 1:
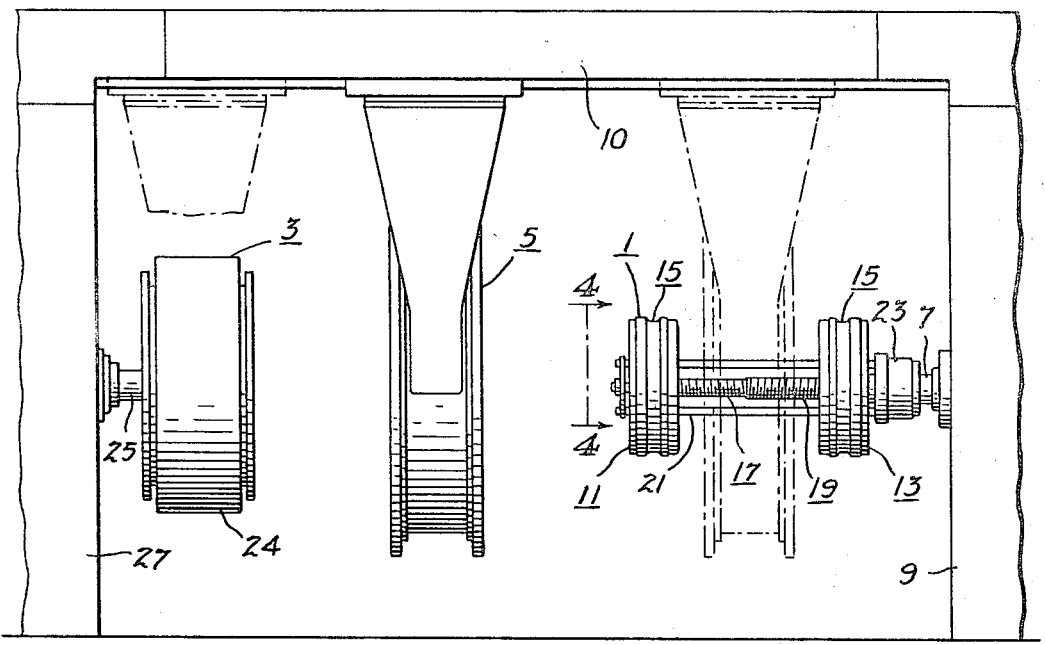
FIGURE 1 is an elevational view of the carcass shaper, together with a drum for constructing the inextensible breaker and tire tread into an annular band and a ring for transferring said annular band to a position surrounding the shaper.

Referring now to FIGURE 1, there is shown a novel carcass shaper 1, a breaker and tread assembly drum 3, and a transfer mechanism 5 normally positioned between the two. The shaper 1 is cantilevered to the end of shaft 7, which shaft extends into a housing 9 containing the various electrical and pneumatic controls, as well as appropriate means for rotating said shaft. The shaper comprises an outboard bead support 11 and an inboard bead support 13. Both of these supports are mounted on a shaft 7, and the peripheral surface of each contains a groove 15, each groove adapted to receive one of the beads of the tire. The shaft 7 contains two sets of threads 17, 19 thereon, the pitch of one set being opposite to the pitch of the other. Each of said bead supports communicates with one of said sets of threads, whereupon rotation of the screw shaft 7 causes the supports to move toward or away from one another. The supports ride on guide rods 21 which are adapted to be engaged to shaft 7 by suitable clutch means contained in housing 23. Thus, the screw shaft can be rotated independently of the bead supports, whereupon the supports will move axially toward or away from one another. Alternatively, when the clutch is engaged, the supports rotate together with the shaft, but do not move axially.

The details of a suitable tread and breaker drum, and transfer mechanism, are described in the aforementioned patent application, S.N. 423,442. Briefly, however, the tread and breaker assembly drum is provided with a substantially cylindrical surface 24, the diameter of which can be uniformly varied. The drum is connected by shaft 25 to suitable driving means within housing 27. Means are provided to regulate and set the diameter of the drum so as to correspond substantially to the outer diameter that the carcass will assume when finished. The tread and breaker are then assembled into annular form on said drum, the assembly having an inner diameter corresponding to said carcass diameter.

The transfer mechanism 5 is adapted to travel on, for instance, a pair of overhead rails located behind the structural member 10 extending from the shaper housing 9 to the drum housing 27. This mechanism consists essentially of an annular rigid ring, and a series of segments disposed around the interior surface thereof. At least one annular inflatable bladder is located between the segments and the ring. Inflation of the bladder causes the segments to move radially inwardly, thereby reducing the effective diameter within the transfer mechanism.

After the tread and breaker are assembled on the drum 3, the transfer mechanism 5 is moved to a position surrounding said drum, and the bladder within the mechanism is inflated to thereby urge the segments radially inwardly into gripping relationship with the outer surface of the tread. Concomitantly therewith, the diameter of the tread and breaker drum 3 is reduced following which the transfer mechanism, gripping the tread and breaker assembly, moves away from said drum. The mechanism 5 then moves the tread and breaker assembly into a position surrounding the shaper 1 after which air is introduced into the interior of the carcass, accompanied by movement of the bead supports 11, 13 toward one another, until the carcass contacts the inner surface of the breaker. Thereafter, the bladder within the transfer mechanism is deflated, thereby causing the mechanism to release its grip on the tread and breaker assembly, after which the transfer mechanism is returned to its normal position. After the tread and breaker are stitched onto the carcass, the bead supports are collapsed and the uncured tire is removed from the shaper and is transferred to a mold where it is cured.

Figure 2:
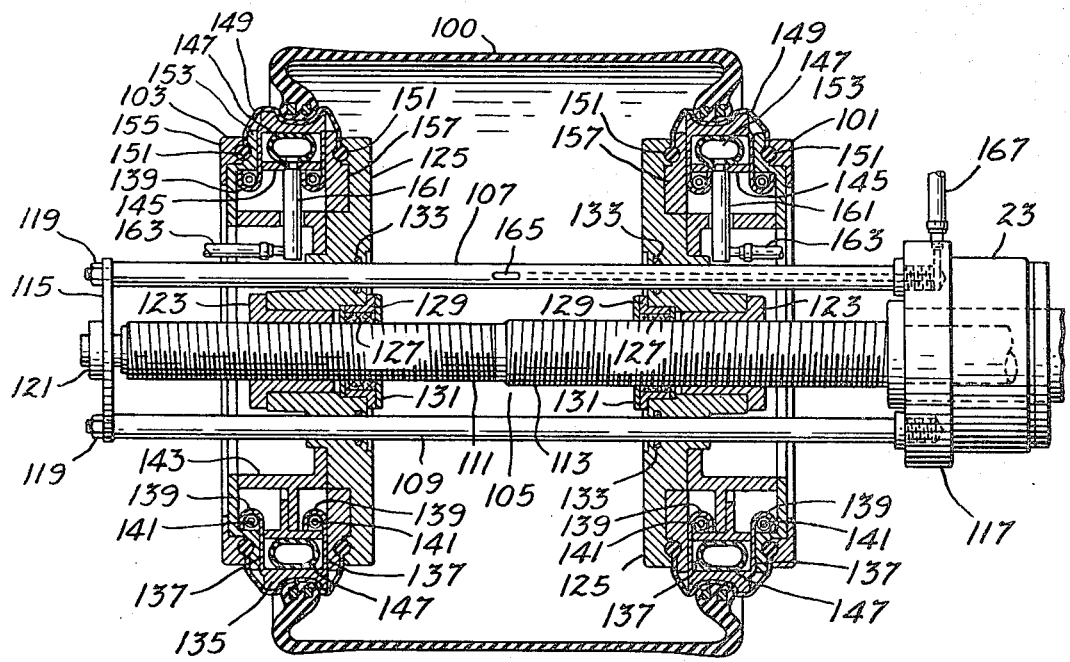
FIGURE 2 is a cross-sectional view of the shaper shown in FIGURE 1 with a carcass, in the flat-band form, placed thereon.

Referring now to FIGURE 2, there is shown a carcass 100 of a heavy duty tire, such as a truck tire having a twin-bead construction, the shape of the carcass corresponding to that which it would have when built by the flat-band process on a collapsible drum. In this as well as the subsequent figures, identical numbers will be used to refer to correspondingly similar parts for purposes of uniformity.

The shaper consists of two generally circular bead-supporting members 101 and 103 mounted on a rotatable screw shaft 105 and adapted to slide on guide rods 107 and 109. The shaft has a necked-down portion 111 provided with threads running in one direction, and a portion 113 of slightly larger diameter with threads running in the opposite direction. The principal purpose of having the outer set of threads 111 with a smaller diameter than the inner set 113 is to facilitate assembly of the various components together.

As was previously stated, suitable clutch means (not shown) are used to connect the guide rods 107, 109 to the screw shaft. End plate 115 and inboard plate 117 serve to maintain the position and alignment of the screw shaft in relation to the guide rods. The rods are secured to the end plate 115 by suitable bolts 119, and are threaded into tapped holes in plate 117. The end of the screw shaft 105 is held within a sleeve 121 welded or otherwise secured to the end plate 115, and containing a bronze bearing or the like thereby permitting the rotation of the shaft relative to the end plate.

Each of the bead-supporting members 101 and 103 is mounted upon the threaded screw shaft 105 in such a manner that the screw shaft can rotate independently of the bead-support member. This independent movement is transmitted through a traverse nut 123 threaded on the screw shaft. Extending radially outwardly from the nut is the bead support head 125. An airtight connection is provided between the shaft and each of the bead support heads by use of a suitable seal 127 held in place by a retainer 129 and an end cap 131. The head 125 is provided with axially extending holes through which the guide rods 107, 109 pass. A suitable O ring 133 provides a substantially airtight connection between the guide rods and each head.

The peripheral surface of each of the bead-supporting members comprises a plurality of rigid segments 135 disposed in side by side relationship around the supporting member. Each of the segments comprises a body portion having a concavity 136 therein conforming generally to the surface contour of the tire beads. Two radially inwardly depending legs 137 terminate in loops 139. These loops are adapted to receive resilient means such as garter springs 141 which serve to urge the segments radially inwardly. This inward movement is limited by a rigid angular segment support 143 which is bolted or otherwise secured to the head 125. An annular inflatable bladder 147 disposed between each of said legs 137 serves, when inflated, to urge each row of segments radially outwardly. The radially outward movement of the segments is limited by the loops 139 contacting the underside of the bladder support 145. The bladder is connected by an annular passageway 161 to air pressure conduits 163.

Overlying the segments, and extending completely circumferentially around each bead-supporting member, is a sealing strip 149 composed of a suitable elastomer or the like. Each edge 151 of the sealing strip has an enlarged circular cross section to facilitate securing the strip in place. The outer edge is securely held between the segment retainer ring 153 and outer clamp ring 155. In like manner, the inner edge is held between the head 125 and the inner clamp ring 157.

As shown in FIGURE 2, the bladders 147 are inflated, thereby causing the segments to assume their radially outermost position, urging the sealing strip 149 into contact with the bead portions of the time. Also as shown in that figure, guide rod 107 is tubular and is provided with an opening 165 which is connected by a conduit 167 to a source of pressurized air.

Reference is now made to FIGURE 3 wherein the tire shaper is shown following rotation of the screw shaft 105 to bring the two bead-supporting members 101, 103 toward one another. During the rotation of the shaft 105 and movement of the two supporting members toward one another, air is introduced through opening 165 in guide rod 107 into the area between the two supporting members. This causes the carcass to be urged radially outwardly. The movement of the tire beads toward one another while pressurizing with air permits the carcass to be formed into toric shape without severe deformation or distortion of the individual cords of the carcass.

After the tread and breaker 171 have been applied to the carcass and stitched into place, the bladders 147 are deflated, thereby permitting the garter spring 141 to urge the segments 135 radially inwardly until the loops 139 abut the segment support 143. Thereafter, the tire can be readily removed from the shaper, without the necessity of ovalizing the beads.

FIGURE 4 shows a portion of the shaper as viewed, for instance, through the transfer mechanism 5. In this figure is shown the end of the screw shaft 105 jutting through the shaft alignment plate 115 and secured within sleeve 121. The upper guide rod 107 and the lower guide rod 109 are secured to said plate by bolts 119.

On the left-hand side of the figure, shown partially cut away, are a plurality of segments 135, and an inflatable elastomeric bladder 147 disposed underneath the segments. The bladder has a valve 173 which is inserted in passageway 161, an airtight seal being provided by O rings 175. The passageway 161 is connected to air-inlet 163 which is in turn connected to a source of high pressure air. The segment legs 137 terminate in loops which collectively define a groove in which a garter spring 141 is disposed. The sealing strip 149 covers the exposed groove forming surface of the segments 135, and the outer edge of the sealing strip is secured between the outer clamp ring 155 and the segment retaining ring 143, as shown on the right-hand side of the figure.

FIGURES 5 and 6 show some of the details of the outer bead-support member; FIGURE 5 showing the segments in their radially inward position, and FIGURE 6 showing the segments radially extended in the bead-gripping position. Although these figures refer to the outboard bead-supporting member 103, it should be understood that the various components are similar in size and shape to those used in the inboard bead-supporting member 101. As previously mentioned, the circumferential surface of the bead-supporting member is composed of a plurality of rigid segments 135, preferably metal, having a concave surface 136 generally conforming to the heel and toe contour of the bead portion of a tire. Overlying said segments is an elastomeric sealing strip 149, the edge portions 151 thereof being generally enlarged to provide means to secure said strip in place. The outer edge portion is securely held between clamp ring 155 and the segment retaining ring 153; and in like manner the inner edge portion is securely held between inner clamp ring 157 and head 125. It should be understood that bolts or other suitable means, although not shown, are used to hold these clamping elements together.

Each segment 135 has two parallel legs 137 terminating in loops 139. These legs extend in a generally radial direction inwardly toward the screw shaft (not shown). The loop portion 139 of each leg cooperates with the corresponding loop portions of the legs of the other segments to define a groove. In this groove is located an annular resilient band 141, preferably a garter spring or the like which serves to urge each of the segments in a direction toward the screw shaft. Segment support 143 limits this inward movement, as shown in FIGURE 5.

Disposed between the two legs 137 of the segments is an inflatable tubular bladder 147 which rests on bladder support 145. As shown in FIGURE 6, the bladder, when inflated, urges the segments radially outwardly, thereby increasing the effective diameter of the groove portion 136 of said segments. The outward movement of the segments is limited by suitable stops, such as those provided when the loops 139 contact the bladder support 145 and the appropriate lip 154 provided on the segment retainer ring. The outward movement of the segments causes some stretching and elongation of the sealing strip 149. As the segments urge the strip into contact with the bead of the tire, the pliable nature of the elastomeric sealing strip serves to provide an airtight seal between the strip and the bead. Thus, when air is introduced into the area between the two bead-supporting members, no appreciable leakage will occur between the beads and the segments.

The segment retaining ring 153 and the inner clamp ring 157 cooperatively define a channel in which the segments move perpendicularly to the axis of the screw shaft. The use of two garter springs of substantially equal size and tension serves to insure that the segments move freely in the channel when the bladder 147 is inflated and deflated.

Inasmuch as the segments move in a radial direction upon inflation of bladder 147, and the concave surface 136 of the segment conforms generally to the shape of the tire bead, the pressure of the segments and sealing strip against the bead is relatively uniformly distributed over the entire contacting surface. An effective seal is thereby obtained. Furthermore, the solid support of the segments underlying the relatively thin sealing strip facilitates sealing.

During the shaping operation, there is a possibility that some air will escape between the screw shaft and the support members, or where the guide rods pass through the support members, or possibly at the bead seal. However, as long as sufficient air pressure is maintained in the region between the two movable support members, and the amount of air being lost is not too great, a small leak will not adversely affect the operation of the shaper.

It is obvious that this invention can be utilized to build tubeless tires which are provided with an inner liner of butyl rubber or chlorobutyl rubber which is highly impervious to air.

In addition, it can be used to build tube-type tires which are not normally provided with an inner liner but are instead equipped with a squeegee which serves to prevent chafing between the carcass cords and the inner tube. This squeegee is sufficiently impervious to air to permit shaping of the carcass with air.

To further illustrate this invention, reference is made to the construction of a heavy duty 10.00–20 radial cord truck tire, each bead thereof containing two inextensible bead bundles. This tire contains a multi-ply carcass, with the cords of each ply extending in a substantially radial direction from the bead to the other. The carcass and beads are assembled in a conventional manner on a collapsible drum or the like to form a flat substantially cylindrical band, with the bead portions turned radially inwardly. The diameter of the cylindrical band is approximately 26½ inches whereas the inner diameter of the beads is approximately 20 inches, and the beads are spaced about 22½ inches apart.

With the peripheral grooves of the two bead-support members on the shaper positioned to conform to the spacing of the beads, i.e., 22½ inches apart, and the bladders underlying the segments of said shaper completely deflated, the carcass is removed from the building drum and is placed on the shaper. When the segment bladders are completely deflated, the diameter of the two bead-support members is about 19½ inches, slightly less than the aforesaid diameter of the beads. With each bead placed in one of the grooves, the bladders are inflated using, for example, about 45 pounds of air pressure to urge the segments and the elastomeric sealing strip overlying said segments radially outwardly into firm airtight contact with the substantially inextensible beads.

If the shaper is used along with a breaker and tread assembly drum and a transfer mechanism of the type shown in FIGURE 1, the tread and breaker are assembled on their drum and are transferred to a position axially centered around the carcass on the shaper. Air under a pressure of about seven and one-half pounds is then introduced into the enclosed space between the two support members to urge the carcass radially outwardly into toric shape. Concomitant with the pressurization, the screw shaft, disengaged from the shaper guide rods, is rotated to move the support members toward one another. Further introduction of air is halted when the carcass makes firm contact with the inside of the annular breaker, and the movement of the support members toward one another is stopped when the beads are about 14 inches apart. The transfer mechanism is then moved away from the shaper. The clutch between the shaper guide rods and screw shaft is then engaged, and the entire assembly is rotated on the shaper while the tread and breaker are manually or mechanically stitched down. Finally, the segment bladders are deflated, thereby breaking the seal between the shaper and the beads and releasing the air pressure from within the carcass. The completely assembled tire is then removed from the shaper, ready for the finishing operations.

If the shaper is not used with the assembly drum and the transfer mechanism, the interior of the carcass is pressurized and the beads are moved in toward one another until the crown of the carcass reaches a circumference of about 117 inches, after which the inextensible breaker strips and tread are manually wrapped around the carcass. The breaker and tread are stitched into place, after which the tire is removed from the shaper, ready for the finishing operations.

Various details concerning the operation of the shaper can be carried out automatically, or manually, as desired. For instance, the introduction of air into the interior of the carcass can be regulated in an automatic manner so as to be proportional to the speed with which the beads move together. On the other hand, each function can be carried out independently of the other. Furthermore, the bladders underlying the peripheral segments can be inflated automatically or manually, either singly or together.

Various modifications can be made in the design of this apparatus without departing from the novel concept embodied therein. For example, the air used to pressurize the region between the two bead-supporting members and to shape the carcass to toric shape can be readily introduced through the screw shaft or through one of the support heads rather than through one of the guide rods as shown. Furthermore, various modifications can be made in the arrangement of parts used to support the bladders, and in the shape, size, and number of the segments used with each support member. Also, other means can be devised for clamping the ends of the sealing strips in place. Other modifications and variations can be made without departing from the scope and spirit of this invention which is defined and delimited by the following claims.

What is claimed is:

1. A tire carcass shaping apparatus, utilized in conjunction with a thread and breaker assembly drum and transfer mechanism, to complete the construction of a radial ply tire following building of the carcass in substantially cylindrical form, comprising:
   (A) A rotatable screw shaft provided with two sets of threads having their pitch opposite to one another,
   (B) A pair of bead-support members, one engaged with each of said sets of threads, each of said support members having a groove running around the circumferential periphery thereof, said groove conforming to, and adapted to receive, one of the beads of a tire carcass,
   (C) Means to increase the effective diameter of each of said grooves to exert a radially outwardly directed grip against the bead, and to decrease the effective diameter to release said grip,
   (D) Means to rotate said screw shaft to move said members alternatively toward or away from one another, and
   (E) An air inlet for introducing air, under pressure, into the space between the support members to transform the carcass from its flat-band shape to toric shape.

2. A shaping apparatus according to claim 1 including means for moving said bead-support members toward one another concurrently with the introduction of air into the space between said members.

3. A carcass shaping apparatus comprising in combination:
   (A) An annual rotatable screw shaft containing two sets of threads of opposite pitch,
   (B) A circular bead-support member engaged with each set of threads, each member including
      (1) A plurality of radially movable rigid segments disposed in side by side relationship around the periphery of said member to form a circular bead receiving groove,
      (2) An elastomeric bead sealing strip overlying the groove formed by said segments,
      (3) An annular air inflatable bladder underlying the segments, and adapted upon inflation to urge the segments radially outwardly to increase the effective diameter of the bead receiving groove, and
      (4) Resilient means for urging said segments radially inwardly upon deflation of said bladder;
   (C) Drive means to rotate said screw shaft to move said bead-support members toward or away from one another, and
   (D) Means to introduce air into the space between the two support members to change the carcass from flat-band shape to toric shape preparatory to applying an inextensible breaker and tread thereto.

4. An apparatus according to claim 3 including means for the concomitant rotation of said screw shaft with introduction of air into the space between the support members to thereby move the beads together during shaping.

5. A carcass shaping apparatus comprising in combination:
   (A) A supported annular screw shaft connected to rotational driving means and containing two sets of oppositely pitched threads,
   (B) A pair of circular bead-support members aligned parallel to one another, each engaged with one set of said screw threads and comprising:
      (1) A plurality of rigid segments placed side by side around the circumferential portion of said member, each of said segments containing a concave portion which, in cooperation with the concave portions of the other segments, defines a radially extending bead receiving groove and a pair of spaced apart radially inwardly directed parallel copending legs, each terminating in a loop,
      (2) An elastomeric sealing strip covering the bead receiving groove and securely anchored to the bead support member on either side of said segments,
      (3) An annular inflatable bladder disposed in a channel formed between two rows of spaced apart legs and adapted, upon inflation, to urge said segments and said sealing strip radially outwardly into airtight engagement with one of the beads of said tire carcass,
      (4) Means for inflating and deflating said annular bladder,
      (5) Resilient means disposed in each row of said loops to resist the radially outward movement of said segments and to urge said segments inwardly upon deflation of said bladder, and
      (6) Means for limiting the outward and inward movement of said segments;
   (C) A plurality of guide rods arranged parallel to said screw shaft and spaced therefrom, the bead-supporting members adapted to ride upon said guide rods while traversing toward and away from one another on said screw shaft,
   (D) Clutch means connecting said guide rods and said screw shaft,
   (E) Means to engage said clutch means to rotate said screw shaft and said support members together, and to disengage the same to rotate said screw shaft independently of said members whereby said members move axially toward or away from one another, and
   (F) Means to introduce air into the space between the two support members concomitantly with movement of said support members toward one another to urge said carcass radially outwardly into toric shape, and (G) Means to deflate said annular bladders to permit removal of the completed tire from said apparatus.

References Cited

UNITED STATES PATENTS

| | | | |
|---|---|---|---|
| 3,342,663 | 9/1967 | Pouilloux | 156—416 |
| 3,364,093 | 1/1968 | Porter | 156—416 X |
| 3,371,005 | 2/1968 | Dailey | 156—416 |
| 3,374,138 | 3/1968 | Porter et al. | 156—416 |
| 2,517,889 | 8/1950 | Kuffler | 156—394 X |
| 2,822,027 | 2/1958 | Hollis | 156—127 |
| 2,871,912 | 2/1959 | Kraft | 156—394 |
| 3,111,445 | 11/1963 | Pouilloux et al. | 156—416 |
| 3,138,510 | 6/1964 | Hindin et al. | 156—416 X |
| 3,278,362 | 11/1966 | Johannes | 156—416 X |

FOREIGN PATENTS

| | | |
|---|---|---|
| 239,897 | 7/1962 | Australia. |
| 906,538 | 9/1962 | Great Britain. |
| 932,792 | 7/1963 | Great Britain. |

HAROLD ANSHER, *Primary Examiner.*